United States Patent
Colpaert et al.

(10) Patent No.: US 12,075,790 B2
(45) Date of Patent: Sep. 3, 2024

(54) INTESTINE SELECTION

(71) Applicant: CTH B.V., Almere (NL)

(72) Inventors: Jeroen René Maria Colpaert, Almere (NL); Johannes Wilhelmus Nicolaas Van Lijssel, Almere (NL); Sander Hendrik Luciën Hochstenbach, Almere (NL); Lars Benjamin Haarmeijer, Almere (NL); Niels Nijenhuis, Almere (NL)

(73) Assignee: CTH B.V., Almere (NL)

( * ) Notice: Subject to any disclaimer, the term of this patent is extended or adjusted under 35 U.S.C. 154(b) by 0 days.

(21) Appl. No.: 18/020,707

(22) PCT Filed: Aug. 31, 2021

(86) PCT No.: PCT/NL2021/050527
§ 371 (c)(1),
(2) Date: Feb. 10, 2023

(87) PCT Pub. No.: WO2022/050836
PCT Pub. Date: Mar. 10, 2022

(65) Prior Publication Data
US 2023/0255217 A1   Aug. 17, 2023

(30) Foreign Application Priority Data
Sep. 2, 2020   (NL) .................................... 2026397

(51) Int. Cl.
  *A22C 17/14*   (2006.01)
(52) U.S. Cl.
  CPC .................... *A22C 17/14* (2013.01)
(58) Field of Classification Search
  CPC ............................... A22C 17/14; A22C 17/16
  (Continued)

(56) References Cited

U.S. PATENT DOCUMENTS

| | | | | | |
|---|---|---|---|---|---|
| 2,433,557 | A | * | 12/1947 | Hurley, Jr. ............. | A22C 17/14 73/37.5 |
| 5,217,404 | A | * | 6/1993 | Lanfrey ................ | A22C 17/14 33/544.3 |
| 2023/0255217 | A1 | * | 8/2023 | Colpaert ............... | A22C 17/14 452/112 |

FOREIGN PATENT DOCUMENTS

| CN | 1042465 A | 5/1990 |
|---|---|---|
| CN | 209073365 U | 7/2019 |

(Continued)

OTHER PUBLICATIONS

International Search Report and Written Opinion, PCT Application No. PCT/NL2021/050527, mailed Nov. 24, 2021 (9 pages).

(Continued)

*Primary Examiner* — Richard T Price, Jr.
(74) *Attorney, Agent, or Firm* — Occhiuti & Rohlicek LLP

(57) ABSTRACT

A system for sizing a natural intestine comprising a carrier, a product transport and sealing system, a measuring system, and a control system. The carrier comprises a fluid channel and a measuring portion. A carrier surface at the measuring portion comprises perforations fluidly connected to the channel. The product transport and sealing system is configured for moving the intestine over the carrier. The intestine surrounds the carrier surface, and for temporarily sealing the intestine along the measuring portion. The measuring system comprises a radiation sensor system for measuring a cross-sectional dimension of the intestine at the measuring portion, a pressure sensor for sensing pressure of the fluid in the channel, and a sensor for sensing a flow of the fluid in the channel. The control system determines a cross-sectional size of the intestine at the measuring portion based on signals of the radiation sensor system, the pressure sensor, and the flow sensor.

17 Claims, 4 Drawing Sheets

(58) Field of Classification Search
USPC .......................................................... 452/112
See application file for complete search history.

(56) References Cited

FOREIGN PATENT DOCUMENTS

| | | |
|---|---|---|
| FR | 1087429 A | 2/1955 |
| GB | 687884 A | 2/1953 |
| WO | 2020002208 A1 | 1/2020 |
| WO | 2020064074 A1 | 4/2020 |

OTHER PUBLICATIONS

Chinese Office Action in CN Application No. 202180052150.5, mailed May 23, 2024 (6 pages).

\* cited by examiner

INTESTINE SELECTION

This application is a 371 national stage application of International Application No. PCT/NL2021/050527, filed Aug. 31, 2021, which claims the benefit of the filing date of Netherlands Application No. 2026397, filed Sep. 2, 2020, the contents of which are hereby incorporated by reference in their entireties.

FIELD OF THE INVENTION

The invention relates to a system for sizing and/or selection of natural intestine. The invention further relates to a method for sizing and/or selection of natural intestine.

BACKGROUND OF THE INVENTION

Processes for treating natural intestines for the use of sausage casings or natural sausage skins are known. WO2014016636, for instance describes a method for preparing natural casing with a uniform caliber. The method is based on subjecting a natural casing to an acid treatment followed by an alkaline treatment and then drying at a mild temperature on a flexible and inflatable support with the desired caliber. The document also describes the natural casing which can be obtained by means of said method, the use thereof for preparing filled products, and the filled product comprising it as skin.

Further, WO2020002208, for instance, relates to a system and method for automatic sorting of natural intestines/casings for use in the production of food products, and especially as casings for sausages. U.S. Pat. No. 2,433,557 A describes an apparatus for inspecting the diameter of flexible tubular casings and more particularly to a photoelectric sizing mechanism which will measure and indicate the diameter of the flexible casing. The apparatus is suitable for measuring and indicating the diameter of any flexible casing and is especially suitable for indicating the size of sausage casings and the like. The sausage casings tested may be either synthetic or made of animal intestines. FR1087429 A, further, describes a method and device for the sizing of intestines from animal intestines.

SUMMARY OF THE INVENTION

Sausage casing, also known as sausage skin or simply as casing, is the material used for enclosing the filling of a sausage. Natural casings are made from animal intestines and therefore may have varying calibers, i.e. the diameter of a casing may vary. The diameter may depend on the type of animal but also on the individual animal that has provided the intestine. The diameter may further change along the length of the intestine. The intestines or casings often come from hogs (pigs), but also the intestines of sheep, goats, cattle and sometimes horses are used. Natural casings are normally made from the sub-mucosa of the small intestine, i.e. a layer of the intestine that consists mainly of naturally occurring collagen. To prepare the intestines as casings, they are flushed, scraped, and cleaned with water and salt. The outer fat and the inner mucosa lining are removed during processing. After cleaning, the cleaned casings also called "cleaned runners" are further processed by selection (and salting) and packaging. During selection, the prepared intestines or casings are especially sorted based on their diameter. At the same time, a quality check may be performed. Low quality parts, e.g., comprising defects like holes, ruptures, the presence of remainders of the (inner) mucosa, the presence of remainders of fat and/or membrane at the outside of the intestine or the presence of unwanted patterns at the outside of the intestine may be removed. Selection is especially based on the quality (parameters) of the intestine. Natural casings are produced and sold almost exclusively by the hank, which is a unit of measure that is approximately 90 meters long. A hank can consist of a varying number of strands (individual parts/pieces of casing) which vary in length. Casings are selected for size or caliber which is measured in millimeters and refers to the diameter of the casing. The size and usage of natural casings are impacted by the animal they are derived from. The size for lamb casings may, e.g. range from 14 mm to 28 mm in diameter, whereas the size for hog casings may range from 28 mm to about 58 mm in diameter.

Sizing and quality checks are normally done by hand and is very labor intensive. Cleaned intestines are filled with water and the diameter of the filled and inflated/expanded portion is determined each couple of meters. Further, defects in the intestines such as holes are observed. The intestine is cut in parts having the same diameter and parts/pieces having defects are removed. The manual handling of the intestine can easily introduce damages to the intestine. The manual handling may further also introduce measuring errors: Intestines are resilient/elastic, and a degree of expanding may depend on the amount of water or pressure of water provided in the intestine. If more water is added, the diameter may increase. The determined diameter may be sensitive to the person performing the measurement. To decrease costs, sizing and selection is often done in low-wage countries. To minimize the carbon footprint and to further standardize the sizing and grading process it appears to be desirable to automate the processing of the casings/(cleaned) intestines at least partly.

Hence, it is an aspect of the invention to provide an alternative system for sizing (and/or selection of) an (natural) intestine (or (natural) casing), which preferably further at least partly obviates one or more of above-described drawbacks. It is a further aspect of the invention to provide a method for sizing (and/or selection of) an (natural) intestine (or (natural) casing), which preferably further at least partly obviates one or more of above-described drawbacks. The present invention may have as object to overcome or ameliorate at least one of the disadvantages of the prior art, or to provide a useful alternative.

In a first aspect, the invention provides a system for sizing (and/or selection of) a(n) (natural) (small) intestine (especially a natural casing or a cleaned (part of a (small)) intestine). In embodiments, the system comprises (i) a product carrier and a product transport and sealing system. In further embodiments, the system (further) comprises a measuring system. Further, especially, the system (further) comprises a control system. In further specific embodiments, the product carrier comprises a fluid channel and especially a measuring portion. The product carrier comprises a product carrier surface. Especially, the product carrier surface at (a location of) the measuring portion comprises one or more perforations (especially a plurality) fluidly connected to the fluid channel. (Each of) the one or more perforations may connect the fluid channel with the surface of the product carrier (at the measuring portion). Further, especially, the product transport and sealing system is configured in embodiments for moving the intestine over the product carrier (in a longitudinal direction, especially of the product carrier). Moreover, especially the intestine (during operations) surrounds the (especially substantially circular) product carrier surface (especially when being moved over the product carrier). In further specific embodiments, the product transport and sealing system is (further) configured for temporarily sealing the intestine (at the product carrier) along at least part of the measuring portion. In specific embodiments, the product transport and sealing system is configured for moving the intestine over the product carrier while sealing the intestine (at the product carrier) along at least part of the measuring portion. Further, especially, the measuring system is functionally connected to the control system. In further embodiments, the measuring system is configured for measuring a (measurable) parameter, especially one or more (measurable) parameters, of the intestine, especially (arranged at the measuring portion. The measuring system may especially be configured for measuring the (one or more) (measurable) parameter(s) of the intestine at (a location of) the measuring portion. In specific embodiments, the measuring system may e.g. comprise a radiation sensor system (especially (also) functionally connected to the control system) for measuring a, especially one or more, (measurable) parameter(s) of the intestine. In specific embodiments, the radiation sensor system is especially configured for measuring a cross-sectional dimension of the intestine, especially (arranged) at the measuring portion. In further specific embodiments, the radiation sensor system comprises a radiation source (and a radiation detector, wherein the radiation source is) radiationally coupled to a (the) radiation detector. Especially, (relative to the radiation source, especially in relation to radiation of the radiation source) the radiation detector is arranged downstream of the measuring portion. In further specific embodiments, the control system is configured for determining a (one or more) quality parameter(s) of the intestine at (a location of) the measuring portion based on one or more signals of the measuring system, especially (at least) based on a signal of the radiation sensor system. In further specific embodiments, the control system, e.g., is configured for determining a cross-sectional size (especially a diameter or caliber) of the intestine at the measuring portion, especially based on one or more signals of the measuring system, more especially based on a signal of the radiation sensor system.

In a further aspect, the invention provides a method for sizing (and or selection of) a(n) (natural) intestine. In embodiments, the method comprises providing the (natural) intestine on a product carrier, especially wherein the intestine surrounds a product carrier surface at a measuring portion (of the product carrier). Further, especially, the method comprises providing a fluid in (the internal space of) the intestine via one or more perforations in the product carrier surface at the measuring portion, especially while sealing the intestine along at least part of the measuring portion. The fluid may especially be provided between the product carrier surface and the intestine. In embodiments, the intestine may be filled/inflated by the fluid. In further specific embodiments, the method further comprises moving the intestine over the product carrier (in a longitudinal direction). Further, especially in embodiments, the method comprises moving the intestine over the product carrier while sealing the intestine along at least part of the measuring portion. The method further may comprise measuring a (measurable) parameter (/characteristic), especially one or more (measurable) parameters (and/or characteristics), of the intestine at the measuring portion. Measuring is especially performed in a measuring stage of the method. In further embodiments, the method comprises emitting radiation by a radiation source (of a radiation sensor system) to the measuring portion and sensing at least part of the radiation with a radiation detector (of the radiation sensor system) at a position downstream (relative to the radiation source) of the measuring portion. The method especially comprises determining one or more (local) quality parameters (and/or defects) of the intestine at the measuring portion. In embodiments, the method may comprise determining a cross-sectional size (e.g. caliber or diameter) of the intestine at the measuring portion based on a signal of the radiation detector (optionally in combination with a signal of the radiation source). The one or more quality parameters, especially the cross-sectional size, may be determined based on a signal of the radiation sensor system.

Hence, the invention provides in embodiments, a system for sizing (and/or selection of) a(n) (natural) intestine, wherein the system comprises (i) a product carrier, (ii) a product transport and sealing system, (iii) a measuring system, and (iv) a control system; wherein the product carrier comprises a fluid channel and a measuring portion, wherein a product carrier surface at the measuring portion comprises one or more perforations fluidly connected to the fluid channel; wherein the product transport and sealing system is configured (i) for moving the intestine over the product carrier, wherein the intestine surrounds the product carrier surface, and (ii) for temporarily sealing the intestine along at least part of the measuring portion; the measuring system comprises a radiation sensor system (functionally connected to the control system) for measuring a cross-sectional dimension of the intestine (arranged) at the measuring portion, wherein the radiation sensor system comprises a radiation source radiationally coupled to a radiation detector, wherein the radiation detector is arranged downstream of the measuring portion, relative to the radiation source; and the control system is configured for determining a cross-sectional size of the intestine at the measuring portion based on a signal of the radiation sensor system.

The invention further especially provides in embodiments, a method for sizing (and/or selection of) a (natural) intestine, wherein the method comprises providing the natural intestine on a product carrier, wherein the intestine surrounds a product carrier surface at a measuring portion; providing a fluid in the intestine via one or more perforations in the product carrier surface at the measuring portion; moving the intestine over the product carrier (in a longitudinal direction) while sealing the intestine along at least part of the measuring portion; emitting radiation by a radiation source (of a radiation sensor system) to the measuring portion and sensing at least part of the radiation with a radiation detector (of the radiation sensor system) at a position downstream of the measuring portion (relative to the radiation source); and determining a cross-sectional size of the intestine at the measuring portion based on a signal of the radiation detector (and a signal of the radiation source), especially based on a signal of the radiation sensor system.

With such system and method, the cross-sectional size (or caliber) may be determined along the entire length of the intestine, allowing to have the size of the intestine as a function of a longitudinal position of the intestine. The size may be determined continuously while transporting the intestine along the measuring system. The size may be determined objectively. The intestine may be moved gently in contrast to the methods performed by hand in which the intestine has to be filled with water and successively has to be measured in a selection block/selection gauge. Especially, the moving and determining the caliber with the selection block may introduce new defects such as tears or rips. Therefore, the system of the invention may handle the intestine more gently, reducing the loss of intestine caused by the handling. Further, the intestine may be cut in parts having substantially the same size after having sampled the entire intestine. Changes in size and/or the quality (parameters) of the intestine may first be observed and based on the entire intestine, decisions regarding how to cut the intestine may be made. In further embodiments of the system also a cutting system is configured which may (automatically) perform the cutting based on the quality (parameters) versus the longitudinal position, especially the size (diameter) versus longitudinal position, as determined by the system. In embodiments, the system allows to detect defects in the intestine as a function of the longitudinal position of the intestine. Hence, additionally or alternatively parts of the intestine comprising defects may be removed after having sampled the intestine, e.g. by the cutting system. Cutting may be based on the quality (parameters) along the intestine. Further, the system allows to size and select the intestines at any location and reduces the undesired transports of the intestine to and from low-wage countries. In embodiments, grading may be done based on the (local) quality (parameter(s)) of the intestine.

The term "sizing" in relation to the method and/or the system may in embodiments relate to calibrating, especially determining a diameter of the intestine, see further below. The term may further relate to cutting the intestine in parts of the intestine. Sizing may in embodiments relate to controlling a length of a part of an intestine. In further embodiments, the term relates to selection. In an aspect, the invention provides the method as described herein (in relation to sizing) for selection of (natural) intestine (or (natural) casing). In a further aspect, the invention provides the system as described herein (in relation to sizing) for selection of (natural) intestine (or (natural) casing). The term "selection" may thus relate to calibrating. The term "selection" may further relate to checking a quality (or a quality parameter) of the intestine. Lower quality parts may be removed (cut) from the intestine and especially high-quality parts may be obtained with the method of the invention. Further, also the term "grading" may be used in relation to determine the quality of the intestine and/or sorting/selecting intestine (parts) based on the quality parameters and especially including the size or caliber of the intestine (part). Grading especially refers to selecting based on the size and/or the quality of (a part of) the intestine. The terms "selection", "selecting" and "grading" in relation to intestine/natural casing may especially be used interchangeably.

As discussed above, the terms "casing" (or "cleaned intestine") and the like relate to sub-mucosa of the (small) intestine. Herein the term "(natural) intestine" may be used to refer to a "cleaned intestine", a "cleaned (natural) casing", or a "(natural) sausage casing". These terms may be used interchangeably. Moreover, because intestines are basically "natural", also just the term "intestine" may be used referring to a natural casing.

Hence, herein the term "intestine" may especially relate to the sub sub-mucosa of the intestine. Moreover, the invention may especially provide a system and a method for sizing (and/or selection of) sub-mucosa of a (small) intestine. The term "intestine" may thus especially refer to the small intestine.

Further, herein the term "intestine" especially relates to an intestine of a (domestic) animal, such as a sheep, a lamb, a hog (pig), a cow/cattle, or e.g. a horse. The system may especially be configured for processing one or more of these types of intestines. In embodiments, the system is configured for processing hog (or pig) intestines. In further embodiments, the system is configured for processing (combinations of) other types of intestines, such as sheep intestines and/or lamb intestines. The differences between the intestines of these different animals may especially be found in a total length of the intestine and a size of the intestine, especially a diameter or caliber of the intestine.

Because the intestine is a natural product, a cross-section of the intestine not necessarily is completely circular and may e.g. be elliptical. The terms cross-sectional size, diameter or caliber used herein in relation to the intestine may therefore especially refer to a size, diameter, or caliber of a circle with a surface area of equal value/size as the cross-sectional area of the intestine (at the location of the cross-sectional size, diameter, or caliber). Furthermore, the term "diameter" may especially refer to the diameter of an expanded intestine, i.e., an intestine filled with a fluid, such as the fluid that may be provided to the intestine in the method of the invention.

Further, because of its nature, the cross-sectional size of the intestine may change along the length of the intestine. When using the intestine as sausage skins, the diameter is preferably constant. Therefore, in embodiments, during processing the (clean) intestine, the intestine may be cut in different parts of the intestine such that each part or strand has a substantially constant diameter, such as within a range of ±5 mm, especially ±2 mm. For example, in embodiments cut parts of the intestine may have a diameter of 40 mm±2 mm, or 35 mm±1 mm or e.g. 54±1 mm (when being expanded) (and other parts may have another diameter).

Further, intestines may be porous by nature. However, during harvesting and cleaning of the intestine (small) holes/perforation or tears may be introduced in the intestine. It will be understood that these kinds of defects may negatively affect the product quality of the casing and the final sausage. Therefore, preferably intestines with perforations and/or tears equal to or larger than 2 mm (in the inflated intestine) are not used in sausage making. Preferably parts of the intestine having these kinds of defects are identified so they can be removed from the intestine. Hence, in embodiment, the system is (also) configured for detecting perforations and/or tears in the intestine (see below).

Herein terms like "inflated", "expanded", "filled" etc. are used in relation to the intestine. These terms especially relate to the intestine being filled with the fluid according to an objective and reproducible procedure. As discussed above, intestines may be elastic and may further expand when the pressure in the intestine is increased. To compare the diameters of different measurements/different intestines, the intestines may be filled in a reproducible way, e.g., to a specific pressure. The specific pressure may e.g. be at least 10 mbar (overpressure), such as at least 30 mbar or at least 40 mbar, or even higher. The specific pressure is especially 100 mbar at maximum. In embodiments, the specific pressure is selected in the range of 20-50 mbar, such as 30-40 mbar (overpressure). Hence, the fluid may be provided at such specific pressure. Further the diameter at the specific pressure may be calculated based on the actual pressure (in the intestine at the measuring portion) and diameter of the expanded intestine.

The product carrier may at least temporarily carry the intestine. The intestine may be provided around (encircling) the product carrier when carrying the intestine. The product carrier may especially have a shape corresponding to a shape of the intestine. The product carrier may be elongated. The product carrier especially comprises a longitudinal axis. A total length of the product carrier may though be smaller than a total length of the intestine. The intestine may e.g. be wrinkled around the product carrier, and especially only a part of the intestine being analyzed/measured may be inflated to its normal dimensions. The total length of the product carrier may in embodiments be in the range of 40-200 cm, such as 40-150 cm, especially 50-100 cm. Yet, in embodiments, the length may be over 2 m. The product carrier may further have a circular cross-section to facilitate moving of the intestine over the product carrier, especially to prevent damaging the intestine when being moved over the product carrier. The product carrier surface may further be smooth, without pronounced edges. In embodiments, the product carrier (surface) is roundish. In further embodiments, the product carrier (surface) is circular. In embodiments, a diameter of the product carrier is in the range of 10-70 mm, especially 10-50 mm, such as 10-40 mm, especially 13-35 mm, such as 15-30 mm. Further to prevent damaging the intestine, friction when moving the intestine may be reduced. In embodiment, e.g. the product carrier surface may be polished or may comprise a coating, e.g. a polymeric coating, such as a polytetrafluoroethylene (PTFE) coating. A smooth surface of the product carrier may further (also) facilitate sealing of the intestine at the product carrier surface without damaging the intestine. The product carrier may be configured to be resistant to water, especially water comprising salt (sodium chloride). In further embodiments, the product carrier comprises stainless steel and/or a polymeric material.

Further, the product carrier is especially at least partly hollow. The product carrier may have a center cavity or a fluid channel inside the product carrier (parallel to the product carrier axis). The product carrier is especially closed at a first end of the product carrier. The fluid channel may be configured for connecting (at another end of the product carrier) to a fluid supply, especially a liquid supply, even more especially a water supply. The fluid may in further embodiments comprises a gaseous phase, such as air. The fluid supply may therefore further comprise an air supply. Hence, the product carrier may in embodiments a tubular element wherein the one or more perforations are fluidly connected by the fluid channel of the tubular element. The tubular element especially comprises stainless steel, especially having a polymeric coating.

The product carrier is further configured for supporting (carrying) the intestine while being measured/analyzed. Therefore, in embodiments, a part, especially a longitudinal part, of the product carrier comprises or defines the measuring portion. The measuring portion may comprise one or more perforations allowing to introduce a fluid in the intestine surrounding the product carrier. In specific embodiments, the measuring portion comprises one or more perforations fluidly connecting the fluid channel with the product carrier surface at the measuring portion. The one or more perforations are especially configured between locations of the product carrier configured for sealing of the intestine at the product carrier. This way, when fluid is provided via the one or more perforations to the intestine arranged at the measuring portion and the intestine is sealed at the product carrier, the intestine may hold the fluid and may inflate. When being inflated, the intestine may be analyzed or measured at the measuring portion. The fluid channel is especially configured for connecting the one or more perforations to the fluid supply.

The measuring portion may comprise two or more perforations. A largest distance (determined parallel to the product carrier) between two of the two or more perforations may be at maximum 10 cm, such as at maximum 5 cm, especially at maximum 2 cm, more especially at maximum 1 cm. In embodiments at least three perforations, such as at least 4 perforations, even more especially at least 5, such as 5-20, especially 5-10 are configured along a line parallel to a length axis of the product carrier ("product carrier axis"). In embodiments, a smallest distance between two (adjacent) perforations is at least 0.2 cm, such as at least 0.5 cm, especially at least 1 cm. For instance, in embodiments, 7 perforations are configured evenly distributed in line at a single line parallel to the product carrier axes, especially wherein a distance between a first one and a last one of the perforations is about 3-10 cm and wherein a distance between adjacently configured perforations is 0.5-1.5 cm. When there are more than two perforations, the perforations may in further embodiments have essentially no mutual distance determined parallel to the product carrier and may be configured. radially distributed around the product carrier axis. Hence, there may essentially be a single section, perpendicular to a length axis of the product carrier, wherein the two or more perforations are configured. For instance, four perforations may be configured with mutual angles of 90°. In further embodiments, the perforations are distributed parallel to the product carrier axis as well as radially around the product carries axis. Further, especially a total flow through area of the perforations (all together) may be configured larger than a flow through area of the fluid channel. In embodiments, a total cross-sectional area of the perforations may be larger than a cross-sectional area of the fluid channel (in the product carrier). The term "cross-sectional area" especially refers to the flow through area. The cross-sectional area of the fluid channel is especially determined by the (inner) area perpendicular to product carrier (especially the fluid channel) axis (at a location of the perforations).

Herein the terms "measuring" and "analyzing" may be used interchangeable. The terms especially relate to measuring one or more (measurable) parameters, especially using the measuring system. Measuring may include sensing. Measuring may comprise using a sensor to sense a parameter/characteristic. The measured parameter/characteristic may e.g. comprise a pattern at the intestine or the presence of mucosa and/or membranes inside or at the outside of the intestine. Measuring may further comprise combining sensed characteristics to provide the measured parameter. Further based on the sensed characteristic and/or the measured parameter a further parameter may be determined by the measuring system or a further system, such as the control system. The terms "measurable" and "measured" in relation to a parameter may in embodiments refer to a parameter and/or a characteristic that may be sensed and/or that may be measured.

For the sake of clarity, herein the measuring system is explained to measure or sense a measurable parameter, and a further system is used to further process, such as convert and/or combine one or more signals provided by the measuring system. It will be understood that such further system may in embodiments be part of the measuring system. The measuring system (and/or elements of the measuring system) is especially functionally connected to the further system, especially to the control system. The signal of the measuring system may in embodiments comprise a combined signal of different elements of the measuring system or e.g. an already pre-processed signal. Additionally or alternatively, the one or more signals of the measuring system may comprise one or more signals of elements of the measuring system, e.g., of the radiation sensor system.

Hence, in embodiments the measuring system may be configured to measure a cross-sectional dimension of the intestine at the measuring portion and generate a corresponding signal. The control system may be configured to determine the cross-sectional size of the intestine at the measuring portion based on this (corresponding) signal.

The term "functionally" in relation to connection between two elements may especially relate to allowing a transmission of information such as signals and data from one element to the other element and optionally vice versa. Transmission of the information may be configured be wired. In further embodiments, transmission may be wireless. Hence the system may comprise one or more transmitters and receivers for transmitting information between elements of the system.

As described above, the radiation system may in embodiments be configured for measuring the cross-sectional dimension of the intestine at (a determined location of) the measuring portion. The radiation source may emit or radiate radiation in the direction of the measuring portion and the radiation detector may detect (at least part of) the radiation downstream from the measuring portion. If a (filled) intestine is present between the radiation source and the radiation detector, then less of the emitted radiation may arrive (incident) at the detector, than if no intestine is present. Hence, the amount of radiation and the location where the radiation incidents (at the radiation detector) relative to the radiation emitted and the location it is emitted from by the radiation source may be used to provide information of the intestine. The (determined location of the) measuring portion for measuring/and or sensing a parameter of the intestine may also be referred to as "measuring location".

The radiation may comprise visible light. Additionally or alternatively, the radiation may comprise one or more of infrared light and ultraviolet light.

The intestine arranged between the radiation source and the radiation detector may provide a shadow at locations downstream (with respect to the radiation source) of the intestine. Hence, in embodiments, the radiation sensor system is a shadow sensor system (comprising the radiation source and the radiation detector). The radiation source and the radiation detector are especially configured as a set (or combination) of the radiation source and the radiation detector. It is noted that the term "shadow" includes complete blocking of light (radiation) as well as party blocking the radiation.

The radiation source and the radiation detector may in embodiments be configured fixed (fixated) in the system. In further specific embodiments, one or more of the radiation source and the radiation detector may be configured mobile. For instance, the radiation source may be configured moveable with respect to the radiation detector to sense (incident) radiation emitted from different locations (yet still upstream from the measuring portion). Likewise, the radiation detector may be configured moveable with respect to the radiation source to sense incident radiation at different locations with respect to the measuring portion. Alternatively, both the radiation detector and the radiation source may be mobile with respect to the measuring portion. Especially, the one or more of the radiation detector and the radiation source are movable in a plane. In embodiments, the one or more of the radiation detector and the radiation source may be configured rotatably around the longitudinal axis of the product carrier. In such embodiments, especially at least part of the circumference of the intestine may be measured. In further embodiments the cross-sectional dimension may be measured.

In further embodiments, the radiation source is configured fixed (stationary), and especially also the radiation detector is configured fixed (stationary). Such embodiments may especially be combined with embodiments wherein the radiation source is configured for emitting radiation in a two-dimensional beam. Such two-dimensional beam may comprise a continuous beam or e.g. a plurality of parallel radiation lines. The two-dimensional beam may comprise a radiation (or light) curtain. The two-dimensional beam especially does not diverge or converge in downstream direction. The radiation detector may be configured for detecting the incident radiation along at least part of a line. The radiation detector may in embodiments comprise a line detector. The line detector may sense two-dimensional beam especially if an axis of the line detector (along the line) is configured parallel to an axis of the two-dimensional beam. The line detector may especially be configured radiationally coupled (over at least 10%, such as at least 50%, or more of a functional (i.e. configured for sensing the radiation) surface of the line detector) with the radiation source. In further specific embodiments, the radiation detector especially comprises an array, especially a one-dimensional array, of radiation detecting elements (or pixels) for detecting at least part of the radiation. The radiation detecting elements are especially configured adjacent to each other along a line. The (one dimensional) array of radiation detecting elements is especially arranged parallel to a face of the radiation source where the two-dimensional beam is emitted from (coupled out). The radiation detecting elements may in further embodiments be arranged in a plane.

Hence, in further embodiments the radiation source is configured for emitting radiation in a two-dimensional beam and the radiation detector comprises an (one dimensional) array of radiation detecting elements for detecting at least part of the radiation. With such embodiments essentially a cross-sectional dimension of the intestine may be measured. In specific embodiments, the radiation source comprises a laser light curtain transmitter and the radiation detector comprises a line laser detector. Using such laser light curtain system, a high resolution (e.g. up to in the micrometer range) may be obtained.

In yet further embodiments, the measuring system comprises more than one set (or combination) of the radiation source and the radiation detector as described above, especially wherein the radiation sources of the respective sets are configured for providing the respective two-dimensional beams mutually at different angles, and especially at the same longitudinal position of the measurement portion. In embodiments, e.g. the measuring system comprises two sets, and the respective two-dimensional beams are provided substantially perpendicular to each other. In further specific embodiments, the measuring system comprises two sets of (i) the radiation source and (ii) (the) radiation detector, wherein the measuring system is configured for providing the two-dimensional beams of the radiation sources of the two sets at a mutual angle ($\alpha$) at (the same longitudinal location of) the measuring portion, especially wherein the angle ($\alpha$) is selected in the range of 60°-120°, especially 80°-100°, even more especially in the range of 85°-95°. Using such measuring system may facilitate processing the measured two cross-sectional dimensions of a noncircular cross-section to an average dimension of a circular cross-section (of the intestine).

Herein the terms "radiation source" and "radiation detector" may refer to a plurality of (different) radiation sources and/or radiation detectors, respectively. Likewise, the term measuring system may refer to more than one measuring system.

The presence of the intestine between the radiation source and the radiation detector may at least partly block the radiation. However, depending on e.g. the transparency of the intestine, not all of the radiation may be blocked. Further, also a presence of other elements between the radiation source and the radiation detector may be sensed by the radiation sensor system. Examples of other elements are e.g. the product carrier (without intestine) as such, remainders of mucosa inside the intestine, remainders of a membrane and/or of fat tissue at the surface of the intestine and water droplets The radiation sensor system may in embodiments e.g. (also) sense the presence of fluid, especially of liquid spraying from the intestine. Hence, in further embodiments the radiation sensor system is (further) configured for sensing a fluid departing from the intestine at the measuring portion. Additionally or alternatively the radiation sensor is (further) configured for sensing one or more of an empty product carrier, and fat tissue and/or a membrane connected to the intestine. In embodiments, the radiation sensor may further be configured for sensing mucosa in the intestine (at the measuring portion), A presence of mucosa inside the intestine may in embodiments result in less radiation being transmitted through the intestine compared to radiation being transmitted through the submucosa alone.

The radiation detector and the radiation source are radiationally coupled especially wherein the radiation source is configured upstream of the measuring portion and the radiation detector is arranged downstream of the measuring section. This not necessary implies that the measuring section is always physically arranged in between the radiation source and the radiation detector. The radiation may e.g. be reflected by further elements, e.g. by one or more mirrors. In embodiments, the measuring portion may be physically arranged between reflective elements reflecting the radiation. Especially, the radiation source and the radiation detector are configured such that the radiation emitted by the radiation source may partly pass the measuring portion and successively impinge at the radiation detector wherein another part of the emitted radiation may impinge/incident at the measuring portion.

During measuring the measurable parameter(s) of the intestine (with the radiation sensor system) continuously fluid may be provided (in) to the intestine. A fluid pressure in the intestine at the measuring portion may not be constant. Consequently, a measured cross-sectional dimension may change over time. Also when holes or tears are present in the intestine, this may reduce the pressure of the fluid at the measuring portion considerably. Therefore, in embodiments, the measuring system further comprises (i) a pressure sensor for sensing a fluid pressure of the fluid in the fluid channel and (ii) a flow sensor for sensing a fluid flow of the fluid in the fluid channel. Based on the fluid pressure in the fluid channel and the fluid flow, fluctuations in the pressure at the measuring portion may be corrected. The pressure at the measure portion may be determined by the fluid pressure in the fluid channel and the pressure drop over the fluid channel, which is a function of the fluid flow in the channel. Based on the determined pressure at the measure portion and the measured cross-sectional dimension, the cross-sectional size of the intestine (at the measuring portion) may be determined.

The term "cross-sectional size" especially refers to the size, especially the diameter, of the intestine inflated at the specific pressure described above. The cross-sectional size may therefore be a standardized size. The cross-sectional size may change along the length of the intestine. The cross-sectional size at different longitudinal positions of the intestine may differ from each other. The cross-sectional size may thus differ from the cross-sectional dimension.

The control system not necessarily is a single physical device, as is also discussed above. The term "control system" may in embodiments refer to a plurality of (different) control systems. A plurality of (parts of the) control system(s) may be configured at different locations of the system. In embodiments, e.g., one or more (parts of the) control system(s) are part of elements of) the measuring system. The plurality of control systems may especially be functionally connected to each other.

The control system may be used for determining the one or more quality parameters of the intestine based on (one or more signals of) the measuring system. The control system may comprise a data storage system for storing the quality parameters, e.g. as a function of (measuring) time. Elements of the measuring system especially measure (measurable) parameters of the intestine at the measuring portion. More especially the parameters are measured at the longitudinal position of the intestine present at the measuring portion. Parameters measured at a specific time may therefore also be correlated with a specific longitudinal position of the intestine. The control system is in embodiments configured for determining and storing one or more quality parameters of the intestine as a function of the longitudinal position of the intestine. The control system may determine one or more quality parameters of the intestine at the measuring portion based on one or more signals of the measuring system, and especially relate these one or more quality parameters to the longitudinal position of the intestine. Hence, the system may allow to relate one or more quality parameters to the longitudinal position of the intestine.

The term "quality parameter" may refer to more than one different quality parameter. Examples of quality parameters are the cross-sectional size, especially the diameter of the intestine, and the presence (or absence) of cavities (at a determined longitudinal position of the intestine). Other examples of quality parameters are the presence (or absence) of parts of the stomach (exit) which may be observed as a specific stomach pattern at the intestine, the presence (or absence) of mucosa inside the intestine, and the presence (or absence) of remainders of fat tissue and/or membranes at the surface of the intestine. Herein, the presence of the above-described features may also be referred to as "defects". Furthermore, the term "defects" also includes the presence of cuts, tears, cavities, etc.

The control system is in embodiments configured for determining a cross-sectional size of the intestine (at the measuring portion) based on one or more signals of the measuring system. In further embodiments, the control system is configured for determining a presence (or absence) of one or more cavities (including tears and cuts) in the intestine (at the measuring portion) based on the one or more signals of the measuring system. The control system is especially configured for determining one or more (values of) quality parameters of the intestine (at the measuring portion) based on the one or more signals of the measuring system.

Hence, in further embodiments, the radiation sensor system is (further) configured for sensing a fluid departing from the intestine at the measuring portion, wherein the control system is (further) configured for determining a presence (or absence) of one or more cavities in the intestine at the measuring portion based on the one or more signals of the measuring system, especially based on the signal of the radiation sensor system.

In further embodiments, the measuring system further comprises (i) a pressure sensor for sensing a fluid pressure of the fluid in the fluid channel and (ii) a flow sensor for sensing a fluid flow of the fluid in the fluid channel and especially, in embodiments, the one or more signals of the measuring system are based on one or more of (i) a signal of the radiation sensor system, (ii) a signal of the pressure sensor and (iii) a signal of the flow sensor. Hence, in embodiments the control system is configured for determining one or more of the cross-sectional size of the intestine and the presence of one or more cavities in the intestine based on one or more of (i) the signal of the radiation sensor system, (ii) a signal of the pressure sensor and (iii) a signal of the flow sensor.

The measuring system may in further embodiments comprise one or more further sensor systems. In embodiments, e.g. the measuring system may comprise a visual sensing system, vision system and/or camera system for measuring or sensing a parameter or characteristic of the intestine (at the measuring portion). For instance, patterns at the intestine or remainders of fat tissue or membranes at the intestine may be sensed by the vision system, optionally in combination with the radiation sensor system. The control system may be configured to further determine one or more of the quality parameters based on a signal of the further sensor system (optionally in combination with one or more signals of other elements of the measuring system). The term "further sensor system" may refer to a plurality of (different) further sensor systems.

In further embodiments, the system comprises a position system for sensing or determining (in combination with the control system) a longitudinal position of the intestine. Based on the position system (comprising part of or functionally coupled to the control system) the longitudinal position of the intestine at the measuring portion may be determined. The position system may comprise a position sensor for sensing the longitudinal position of the intestine at a position sensing position. The position sensing position essentially comprises a longitudinal position of the intestine sensed by the position sensor and may in embodiments comprise a location of the position sensor. In further embodiments, the position sensor may sense a velocity of the intestine at the position sensor position. The position system may in embodiments comprise a position system sensing a velocity of the intestine passing the position system. The position system may relate to remotely sensing, such as acoustically sensing the position or velocity. The position system may be based on radiationally sensing, such as by infrared radiation. In further embodiments, the sensor system may be based on physical contact between the intestine and the position system. The position system may e.g. comprise a measuring wheel system. Such measuring wheel system comprises a wheel or just any other rotatable element connected to a sensor or encoder for sensing the rotational speed of the wheel. By moving the intestine over (and contacting) the wheel (surface), the wheel will rotate, and the velocity of the intestine may be determined.

Hence, in further embodiments, the system (further) comprises a position system (functionally connected to the control system) comprising a position sensor for sensing one or more of (i) the longitudinal position of the intestine at a position sensing position of the intestine, especially at (a location of) the position sensor and (ii) a velocity of the intestine at the position sensing position of the intestine, especially at (a location of) the position sensor. Further especially the control system is (further) configured for determining the longitudinal position of the intestine at the measuring portion based on a signal of the position sensor. The position system especially comprises a measuring wheel system comprising a measuring wheel, wherein the measuring wheel system is configured for sensing the longitudinal position of the intestine contacting the measuring wheel.

In further embodiments, the system further comprises a tension application element (arranged upstream of the measuring wheel and) configured to maintain tension on the intestine at the measuring wheel. The tension application element may prevent slippage of the intestine at the surface of the measuring wheel. Further, by tensioning the intestine at a predetermined force, the intestine may be stretched over known percentage. The relative change in length reduces after an initial increase in tension. Hence, a minimum predetermined tension may be provided by the tension application element. The tension may in embodiments be at least 10 Newton, such as at least 15 Newton. The tension provided may especially be no more than 25 Newton. The tension application element may in embodiments be configured to guide the intestine upstream of the measuring wheel, especially to increase a contacting area between the intestine and the measuring wheel. The tension application element may comprise a friction element configured for contacting the intestine (upstream of the measuring wheel). The tension application element may comprise a rough surface for contacting the intestine. In embodiments, the tension application element comprises a brush for contacting the intestine.

Herein the terms "upstream and "downstream" are used, such as in phrases like "The detector is configured downstream of the measuring position (relative to the radiation source)", and "The tension application element is arranged upstream of the measuring wheel", and "The intestine is cut downstream of cavities". The terms "upstream" and "downstream" relate to an arrangement of items or features relative to the propagation of an element such as a particle or a fluid in a channel or, e.g., an intestine along a process line, or light/radiation in a beam of light/radiation (during operation), wherein relative to a first position within the channel/along the process line, or within the beam, a second position in the channel/along the line or within the beam closer to an inlet/feed (for the element, fluid or intestine) of the channel/the process line, or closer to a light generating means/radiation source respectively is "upstream", and a third position within the channel/along the process line further away from the inlet or feed section, or further away from the light generating means respectively "downstream". Hence, during operations, the intestine may be moved from an upstream location to a downstream location. When viewed in a direction of movement of the intestine along the process line, the longitudinal position of the intestine ranges from the upstream side to the downstream side. If the direction of movement or propagation changes, also the upstream side and the downstream side change. Further, radiation may propagate from a radiation source at the upstream side to a radiation detector at the downstream side.

The system is configured for at least partly sealing the intestine at the product carrier at one or more locations of the product carrier. Sealing is especially provided at at least a first sealing location (of the product carrier) and a second sealing location (of the product carrier) spaced apart from the first sealing location. Further, sealing may be provided along at least part of a circumference of the product carrier. Sealing may e.g. be provided along at least 50%, such as along at least 70%, especially along at least 90% of the circumference of the product carrier (e.g. at the first and second sealing location). Sealing may in embodiments be provided along substantially the entire circumference of the product carrier. In embodiments, at least part of, especially all of, the one or more perforations are configured between the first sealing location and the second sealing location. In such embodiments, a fluid may be provided (in)to the intestine for filling and expanding the intestine (and/or for maintaining the expansion of the intestine) between the first and second sealing location, especially between a first seal and a second seal. In embodiments a fluid may be provided continuously through the one or more perforations. The seals do not necessarily hermetically seal the intestine to the product carrier.

Herein the terms "sealing", "seal", etc. in relation to sealing the intestine to the product carrier especially relates to closing one or more passages between the intestine and the product carrier in such extend that an expansion of the intestine (between the seals) may be maintained when continuously only a small amount of fluid is provided to the intestine for obtaining a substantially constant volume (e.g. 100-200 ml) in the expanded part of the intestine. In embodiments, fluid is provided based on the fluid pressure of the fluid in the fluid channel (fluid may be provided if the pressure is lower than a predetermined set point (especially lower than the specific pressure)). In embodiments, e.g. some fluid may escape via the seal, while the intestine may maintain its expanded configuration.

The sealing may be provided with sealing elements. Especially, the sealing elements also allow transport (moving) of the intestine over the product carrier. In embodiments, each of the sealing elements comprises a shape being complementary to a (cross-sectional) shape of (the surface of) the product carrier. The shape of product carrier may e.g. be circular (see also above), and the sealing elements may comprise a circular opening. A diameter of the circular opening is especially larger than a diameter of the product carrier allowing the intestine to be moved between the product carrier and the sealing elements. In further embodiments, the sealing element may be formed by a plurality of sub-elements, wherein a total of the sub-elements defines the shape being complementary to the shape of the product carrier. In embodiments, e.g. the sealing element comprises two sub elements, both comprising a groove, especially an elongated groove. The elongated grooves (in cross-sectional view) may especially define half of a circular opening. By enclosing the product carrier (with the intestine) with the two sub-elements wherein the grooves face each other, a sealing element may be formed having a circular opening (comparable to the one described above). The above-described elements may especially be sliding sealing elements, i.e. when the intestine is moved (in a longitudinal direction) in the elements, the intestine may slide over a surface of the groove. In yet further embodiments, one of the sub-elements comprises such sliding sealing sub-element comprising the elongated groove, and a second one of the sub-elements comprises a rotatable element, such as a wheel, especially also comprising a (circumferential) groove. When arranging these sub-elements around the intestine at the product carrier (with the grooves facing each other) also a seal may be provided. In embodiments, the first sealing element and/or the second sealing element may comprise a sliding sealing sub-element in combination with a wheel comprising the circumferential groove. When moving the intestine over the product carrier, the wheel may rotate. Moreover, rotating the wheel may in such embodiment move the intestine over the product carrier. Hence, in embodiments one or more of the wheels are configured to be driven. The sealing system may therefore especially function as a product transport system and a sealing system. In yet further embodiments, each of the sealing element comprises two sub-elements, both comprising the wheel comprising a circumferential groove.

Hence, in further embodiments, the product transport and sealing system comprises a first set of (rotatable) wheels and a second set of (rotatable) wheels, wherein each wheel comprises a surface with a circumferential groove with a shape complementary to a shape of the surface of the product carrier. Especially, one or more of the first set of wheels and the second set of wheels is configured for moving the intestine over the product carrier. Especially, at least one of the wheels is configured to be driven. The wheels are especially configured for providing the seals for maintaining the intestine in the expanded configuration as described above. Hence, especially the first set of wheels and the second set of wheels are configured for sealing the intestine at the product carrier. The first set of wheels may e.g. be configured for providing a seal at the first sealing location and he second set of wheels may be configured for providing a seal at the second sealing location.

In further advantageous embodiments at least one of the wheels is configured (translationally) mobile, especially to temporarily not seal the intestine at the product carrier. This may allow an escape of air from the intestine at the measuring portion, e.g., when filling the intestine with liquid. Especially when starting the process, it may be useful to let any air escape. After having the air escape from the intestine, the intestine may be filled with the liquid, and especially the at least one wheel may be moved towards the other wheel of the set of wheels to define the seal. Hence, in embodiments, at least one of the wheels of the one or more of the first set of wheels and the second set of wheels is configured (translationally) mobile relative to the other wheel of the respective set of wheels, to temporarily not seal the intestine at the product carrier.

In further embodiments, the system further comprises a cutting system. The cutting system is especially configured for cutting the intestine based on the (local) quality (parameters) of the intestine, such as the local appearance of defects or a change in caliber of the intestine. The cutting system is in embodiments configured for cutting the intestine into parts or strands with a determined diameter. Cutting is especially done in the cutting stage. The cutting system may in further embodiments be configured for removing parts of the intestine that do not meet (required) quality parameter(s) (values). The cutting system may be configured to remove parts of the intestine with defects such as perforations, cavities, cuts, and tears (and/or other defects described above). The cutting system may be functionally connected to the control system. The control system may in embodiments control the cutting system. The control system may especially control the (longitudinal) positions of the intestine to cut. Based on the prior determination of the quality parameters (obtained during measuring), the quality parameters are known (by the control system) as a function of the longitudinal position. The control system may allow cutting the intestine based on the (local) quality parameters at the longitudinal position of the intestine. For instance, the cross-sectional size of the intestine and the presence of cavities in the intestine may be known as a function of the longitudinal position. Based on this information the intestine may be cut a few cm, such as 0.5-15 cm, especially 5-10 cm, downstream of the defects and upstream of the defects. Based on the information, the intestine may further be cut a few cm, such as 0.5-15 cm, especially 5-10 cm downstream of relevant changes in the diameter of the intestine. Such relevant change in the diameter may relate to a sudden increase or decrease in the diameter, of e.g. more than 2 mm. Such relevant change may also relate to leveling out of the diameter of the intestine upstream of a sudden increase or decrease. As such, in embodiments parts defining a transition between two diameters may be removed. In further embodiments, the part defining the transition may remain attached to either the downstream part or the upstream part (after cutting).

It is noted that cutting an intestine at a location downstream of a defect, relates to the fact that the cut is made at a location of the intestine that passes the cutting system before locations comprising the defect may pass the cutting system.

Hence, in embodiments, the cutting system is configured for cutting the intestine at a predetermined longitudinal position of the intestine, wherein the predetermined longitudinal position is determined by the control system based on the quality (parameter) of the intestine (at a further longitudinal position) (wherein the further longitudinal position is upstream of the predetermined longitudinal position of the intestine). Especially, the cutting system is configured for cutting the intestine at a predetermined longitudinal position of the intestine, wherein the predetermined longitudinal position is determined by the control system based on one or more of a change in the cross-sectional size of the intestine (at a further longitudinal position) and the presence of cavities in the intestine at a further longitudinal position, (wherein the further longitudinal position is upstream of the predetermined longitudinal position of the intestine). Additionally or alternatively, the predetermined longitudinal position is determined on a defect of the intestine (at a further longitudinal position) (wherein the further longitudinal position is upstream of the predetermined longitudinal position of the intestine). Especially, a distance between the predetermined longitudinal position and the further longitudinal position is in the range of 1-15 cm, such as 5-10 cm.

The parts of intestine provided after cutting are in further embodiments sorted and/or collected. Therefore, the system may further be configured for sorting and/or collecting. The system may in embodiments be configured for cutting the intestine once and providing two parts. The system also may be configured for cutting the intestine in 10 parts, or even more parts. The number of parts is especially based on the number of changes in the diameter and/or the number of locations comprising defects such as cavities in the intestine. The cutting system may in embodiments be configured not to cut the intestine if the quality of the intestine substantially does not change over the length of the intestine. In embodiments the part of the intestine comprises the entire intestine. Hence, the cutting system may in embodiments be configured for selecting (sorting and/or collecting) the (entire) intestine. The cutting system may especially be configured for cutting the intestine at n predetermined longitudinal positions of the intestine to provide n+1 parts of the intestine. Especially n is at least 1. In embodiments, n equals 0 and no cutting is provided.

Hence, in further specific embodiments, the system further comprises a collecting system functionally connected to the control system, wherein the cutting system is configured for cutting the intestine at n predetermined longitudinal positions of the intestine to provide n+1 parts of the intestine and wherein the collecting system is configured to sort and collect the parts of the intestine based on one or more of (the value of) the local quality parameters, especially wherein the parts are sorted based on at least one of the (i) cross-sectional size of the part of intestine and (ii) the presence of cavities in the part of intestine.

Herein, the terms "quality" and "quality parameter" are used in relation to the intestine referring to the (product) quality of the intestine which may be determined based on one or more (values) of the quality parameter (especially as a function of the longitudinal position of the intestine). For instance, the term quality may refer to a substantially constant intestine caliber of a specific size. As such e.g. the value of the quality parameter "caliber" may be in the range of the specific size±a predetermined margin (of e.g. a few mm). Further, the quality may refer to the absence of a specific defect, such as the absence of cavities and especially the value of the quality parameter "presence of cavities" may be "no".

The cutting system is especially configured downstream from the measuring system. The cutting system may in embodiments be configured like elements or parts of the system arranged upstream of the cutting system. The cutting system may in embodiments also comprise a further product carrier (for carrying at least part of the intestine). Further, the cutting system may comprise a further transport system (for moving the at least part of the intestine over (around) the further product carrier). The cutting system essentially comprises a cutting device. The cutting device may in embodiments comprise a rotatory cutting knife, or rotating knife. The cutting knife may in embodiments have a single rotating blade or a plurality of blades. In other embodiments, the cutting device may comprise a water jet or e.g. a laser. The cutting device may especially be configured for cutting the intestine at a cutting location between the product carrier and the further product carrier, especially wherein the product carrier and the further product carrier are arranged in a remote configuration. In further embodiments, the cutting system further comprises a moving system, especially for moving an extreme (end) of the intestine (or remaining part of the intestine) arranged at the product carrier to the further product carrier, especially wherein the product carrier and the further product carrier are arranged aligned and in an adjacent configuration. The first end of the product carrier and a first end of the further product carrier may be configured complementary. The respective ends may for instance interlock in the adjacent configuration. One of the respective ends may have a protrusion and the other end may have a cavity for hosting the protrusion in the adjacent configuration. One of the ends may be spherical and the complementary end may be partly hollow to receive the spherical end in the adjacent configuration In specific embodiments, the cutting system comprises a further product carrier, a further product transport system, a moving system and a cutting device; wherein (i) the moving system is configured for moving an extreme of the intestine arranged at the product carrier to the further product carrier, while the product carrier and the further product carrier are arranged aligned and in an adjacent configuration; (ii) the further product transport system is configured for moving (at least part of) the intestine over the further product carrier (wherein the intestine surrounds a further product carrier surface); and (iii) the cutting device is configured for cutting the intestine at a cutting location between the product carrier and the further product carrier, while the product carrier and the further product carrier are arranged in a remote configuration.

The cutting system may further especially comprise a further position system, especially (also) functionally coupled to the control system. In further embodiments, the control system is further configured for determining the longitudinal position of the intestine at the cutting location based on a signal of the further position system. As, such cutting may be performed at one or more longitudinal locations of the intestines that have been identified upstream (along a process line of) in the system (when measuring the intestine).

The further position system may also comprise a (further) measuring wheel system comprising a further measuring wheel, especially wherein the further measuring wheel is configured between the product carrier and the further product carrier, wherein the product carrier and the further product carrier are arranged in an remote configuration, and wherein the further measuring wheel system is configured for sensing the longitudinal position of the intestine contacting the further measuring wheel. The further position system is further especially configured for maintaining tension on the intestine. In embodiments, the system comprises a further tension application element arranged upstream of the further measuring wheel. The further tension application element may be configured as described in relation with the tension application element. Especially, the further measuring wheel in combination with the further tension application element may tension the intestine. The intestine may be stretched in agreement with the stretching by the position system, such the longitudinal positions determined using the position system and using the position system are comparable.

In the adjacent configuration, the product carrier is especially aligned with further product carrier. In further embodiments, the product carrier and the further product carrier are (also) aligned in the remote configuration, see further below.

The product carrier may further especially be configured movable from a first product carrier position, wherein the transport and sealing system encloses (at least part of) the product carrier, to a second product carrier position, wherein the product carrier is aligned with the further product carrier. The product carrier may be moved between the first product carrier position (used) in the measuring stage to the second product carrier position (used) in the cutting stage. Further, also the further product carrier and the product carrier may be moveable with respect to each other. In the adjacent configuration an inter carrier distance between the product carrier and the further product carrier may be very small such as from about zero cm to a few centimeters, allowing the transfer from the extreme of the intestine from the product carrier to the further product carrier. In the remote configuration the inter carrier distance may be larger, such as at least a few cm, especially at least 5 cm, such as at least 10 cm. The inter carrier distance in the remote configuration is especially smaller than 50 cm, such as smaller than 30 cm. The inter carrier distance in the remote configuration may especially be configured for allowing the cutting device to cut the intestine at the cutting location between the further product carrier and the product carrier. The inter carrier distance in the remote configuration may further especially be configured for arranging the further measuring wheel at a location between the product carrier and the further product carrier.

In specific embodiments a ratio of an inter carrier distance between the product carrier and the further product carrier in the remote configuration to the inter carrier distance in the adjacent configuration is at least 10, such as at least 50 or even more (especially for the intercarrier distance in the remote configuration being substantially zero the ratio is substantially infinite).

Herein, the term further product carrier may relate to a plurality of further product carriers. The system may especially comprise a plurality of further product carriers each for carrying a part (of the intestine) that has been cut from the intestine. Sequentially one of the further product carriers may be aligned with the product carrier (carrying the intestine) and receive an extreme of the intestine. Successively, after cutting the intestine, the part of the intestine up to the cut may also be moved to the further product carrier. Next, another further product carrier may be aligned with the product carrier and the process may be repeated until all of the intestine is moved from the product carrier to one or more of the further product carriers.

In yet further embodiments, the system comprises a further product carrier system; wherein the further product carrier system comprises a plurality of further product carriers, wherein the system is configured to move successive extremes of the intestine to different further product carriers. The product carrier system may at least comprise two further product carriers, such as at least three or at least four further product carriers.

Furthermore, in further embodiments, the system (also) comprises a plurality of product carriers and at least two cutting systems. The (plurality of) product carrier(s) may further especially be are arranged in a transport system, (the transport system) especially configured for transporting the product carrier(s) from a first location wherein the transport and sealing system encloses (at least part of) the product carrier to a second location, wherein the product carrier is aligned with the further product carrier of (one of) the cutting system(s).

In a further aspect, the invention provides the method for calibrating/sizing a(n) (natural) intestine. The method especially at least comprises a measuring stage. In the measuring stage the product carrier may be arranged at a first carrier position. In embodiments, the method, especially the measuring stage, comprises measuring (and/or sensing) a (measurable) parameter (and/or characteristic), especially one or more (measurable) parameters (and/or characteristics), of the intestine at the measuring portion. In specific embodiments, see also above, the method comprises emitting radiation by a radiation source (of a radiation sensor system) to the measuring portion and sensing at least part of the radiation with a radiation detector (of the radiation sensor system) at a position downstream (relative to the radiation source) of the measuring portion. Further, the method may comprise determining a cross-sectional size (e.g. caliber or diameter) of the intestine at the measuring portion based on a signal of the radiation sensor system. The method especially comprises determining one or more (values of) quality parameters of the intestine at the measuring portion, especially determining one or more (values of) quality parameters as a function of the longitudinal position of the intestine. The method may in embodiments be performed in the system of the invention. Especially, (elements of) the system of the invention may be used in the method of the invention.

In further specific embodiments, the method (further) (also) comprises determining a presence (or absence) of one or more defects (described herein), such as one or more cavities, at the measuring portion based on the signal of the radiation sensor system. In further embodiments, on or more of the quality parameters are further (also) determined based on a further sensor system.

The method especially comprises providing the fluid to a fluid channel fluidly connected to the perforation, to provide the fluid in the intestine. In embodiments, the method further comprises sensing a fluid pressure and a fluid flow of the fluid in the fluid channel and especially determining the cross-sectional size of the intestine and optionally the presence of one or more cavities at the measuring portion based on the fluid pressure (in the fluid channel), the fluid flow (in the fluid channel) and the signal of the radiation sensor system. In embodiments, the fluid pressure at the measuring portion is determined based on the fluid pressure and the fluid flow in the fluid channel. The fluid pressure at the measuring portion is especially determined by the control system. Furthermore, the control system may control the fluid flow in the fluid channel. The fluid flow through the channel may in embodiments be controlled based on the fluid pressure in the fluid channel.

In yet further embodiments, the method further comprises determining a longitudinal position of the intestine at the measuring portion and especially determining one or more quality parameters, especially the cross-sectional size and optionally defects such as the presence of one or more cavities, as a function of the longitudinal position of the intestine.

Further, the method may comprise cutting and/or sorting the intestine. Cutting (and/or sorting) may be performed in the cutting stage. The cutting stage may be configured after the measuring stage. In embodiments, the cutting stage comprises sorting (and/or selecting) without cutting the intestine.

In specific embodiments, the method further comprises (the cutting stage comprising) cutting the intestine at a predetermined longitudinal position of the intestine, especially based on the cross-sectional size and optionally the presence of one or more cavities as a function of the longitudinal position of the intestine. Cutting the intestine may be controlled by the control system. Especially, the predetermined longitudinal position is determined by the control system.

In embodiments, the predetermined longitudinal position of the intestine comprises a longitudinal position wherein one or more of (i) the cross-sectional size of the intestine changes and (ii) the presence of a defect, especially the presence of one or more cavities, manifests at a further longitudinal position, upstream of the predetermined longitudinal position of the intestine, especially wherein a distance between the predetermined longitudinal position and the further longitudinal position is in the range of 1-15 cm, such as 5-10 cm.

The terms "predetermined longitudinal position" and "further longitudinal position" may especially refer to a plurality of predetermined longitudinal positions and further longitudinal positions, respectively.

In specific embodiments the method comprises (i) cutting the intestine at n predetermined longitudinal positions of the intestine to provide n+1 parts of the intestine (based on the cross-sectional size and optionally the presence of one or more cavities as a function of the longitudinal position of the intestine), and (ii) sorting the parts of the intestine, based on at least one of the (iia) cross-sectional size of the part of intestine and (iib) the presence of cavities in the part of intestine. Especially at the n predetermined position one or more of (ia) the cross-sectional size of the intestine changes and (ib) the presence of one or more defects, especially the presence of one or more cavities, manifests at a further longitudinal position, upstream of the respective predetermined longitudinal position of the intestine. In embodiments n equals 0, and especially sorting may be performed with first cutting the intestine.

The term "change" in phrases like "a change in the cross-sectional size" especially relates to a relevant change. Such relevant change may e.g. be a change of at least 2 mm, or at least 3 mm. The change may in embodiments be relevant if the size changes more than 4 mm along a longitudinal distance of at least 5 cm or, e.g., a change of 2 mm over at least 10 cm length. Whether a change is relevant may further in embodiments be set, or e.g. be determined by the control system, especially after having analyzed the entire intestine.

The measuring stage may be performed at a first location of the system. The cutting stage is especially performed at another location of the system. Therefore, especially the product carrier is mobile. In the method, initially the intestine may be analyzed (in the measuring stage) wherein the entire intestine is moved around the product carrier. Successively, the product carrier carrying the intestine may be moved to a cutting location for carrying out the cutting stage.

Hence, in embodiments, the method further comprises moving the product carrier comprising a single intestine from a first carrier position (of the system) to a second carrier position (of the system), wherein (at the second carrier position) the product carrier is aligned with a further product carrier. The method may in specific embodiments further comprise (a cutting stage comprising) (i) moving an extreme of the intestine from the product carrier to the further product carrier configured in the adjacent configuration (wherein the product carrier and the further product carrier are aligned); (ii) arranging the further product carrier comprising the extreme of the intestine and the product carrier comprising the remainder of the intestine in the remote configuration; (iii) moving the intestine over the further product carrier in the remote configuration, while determining the longitudinal position of the intestine at a cutting location between the product carrier and the further product carrier; and (iv) cutting the intestine at the cutting location based on a (cutting) signal of the control system, thereby providing at least a (calibrated) part of the intestine at least partly arranged at the further product carrier (and optionally a remaining part of the intestine arranged at least partly at the product carrier). The (cutting) signal of the control system is especially based on the (determined) cross-sectional size and optionally the presence of one or more cavities as a function of the longitudinal position of the intestine. The signal may e.g. be provided when one or more cavities are present 1-15 cm, such as 5-10 cm upstream of the cutting location or when the cross-sectional size changes 1-15 cm, such as 5-10 cm upstream of the cutting location.

In further embodiments, the method further comprises repeatedly carrying out the stages of (i) moving the further product carrier comprising the (calibrated) part of the intestine (or in embodiments the entire (calibrated) intestine) away from the product carrier, and (ii) successively aligning another further product carrier with the product carrier, and (iii) successively repeating the cutting stage until all of the intestine is moved from the product carrier. In further embodiments, the method further comprises removing the (calibrated) part of the intestine (or the entire intestine) from the one or more further product carriers and sorting the (calibrated) (parts of the) intestine based on the respective cross-sectional size of the (calibrated) (part of the) intestine.

The term "controlling" and similar terms herein especially refer at least to determining the behavior or supervising the running of an element, especially wherein the element is configured to adjust the treating of the damages skin tissue. Hence, herein "controlling" and similar terms may e.g. refer to imposing behavior to the (controllable) element (determining the behavior or supervising the running of an element), etc., such as e.g. measuring, displaying, actuating, opening, shifting, changing temperature, etc., especially actuating. Beyond that, the term "controlling" and similar terms may additionally include monitoring. Hence, the term "controlling" and similar terms may include imposing behavior on an element and also imposing behavior on an element and monitoring the element. The controlling of the element can be done with the control system. The control system and the (controllable) element may thus at least temporarily, or permanently, functionally be coupled. The element may comprise at least part of the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figure 1:
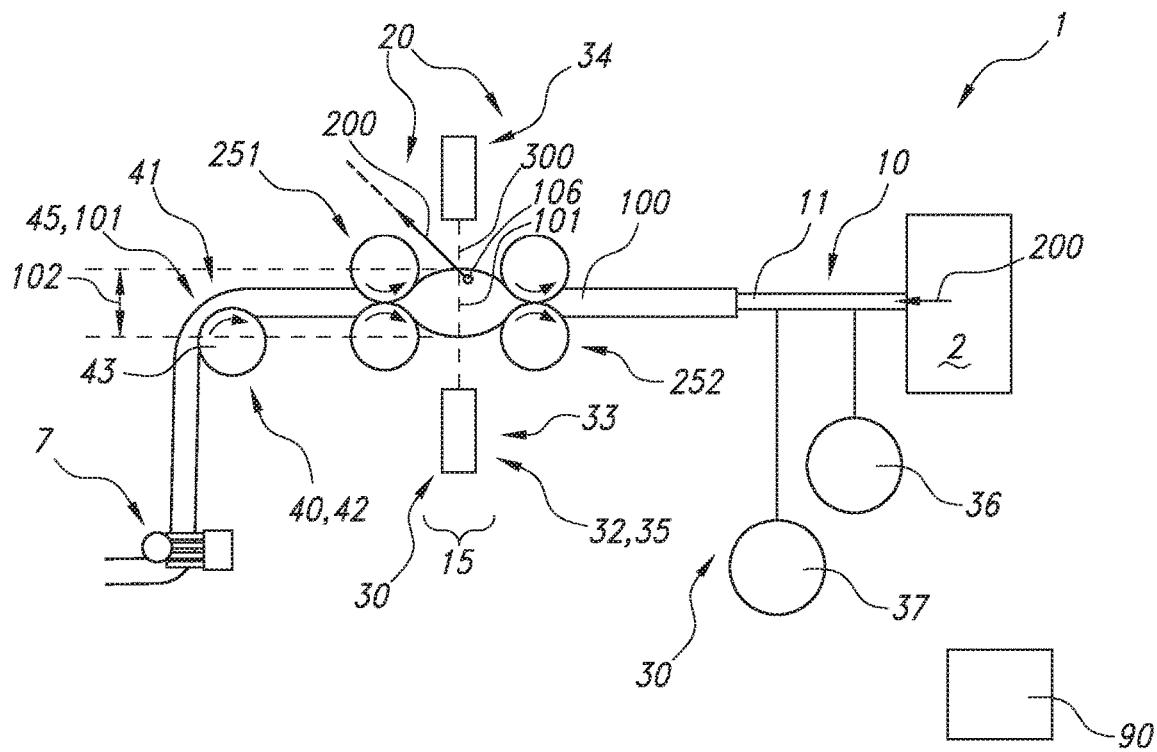
FIG. 1 schematically depicts an embodiment of the system of the invention.
Figure 2:
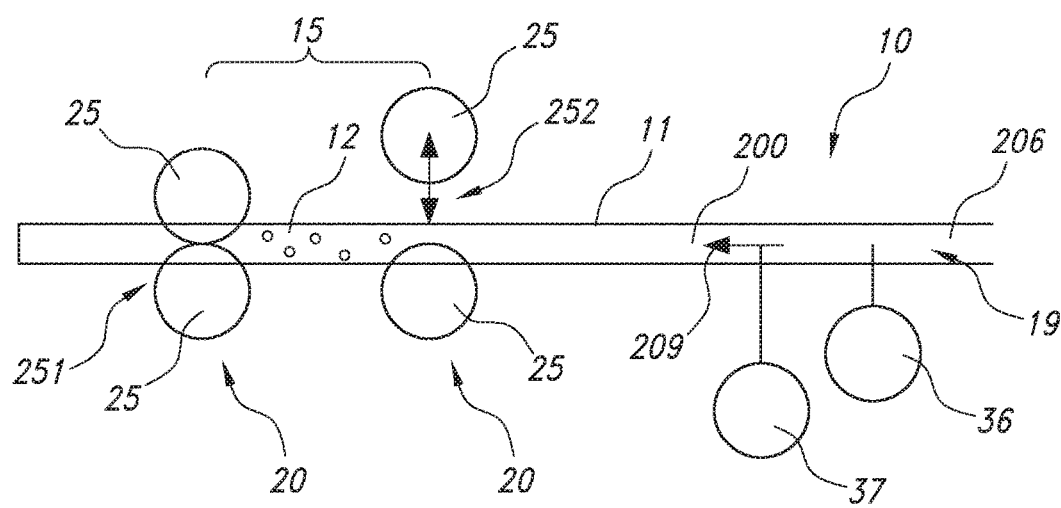
FIGS. 2-3 schematically depict some further aspects of the invention.

FIG. 1 schematically depicts an embodiment of the system 1 of the invention. The embodiment may be used for the measuring stage of the method. The system 1 is configured for sizing a natural intestine 100. The depicted embodiment comprises a product carrier 10, a product transport and sealing system 20, a measuring system 30, a position system 40, and a control system 90. The product carrier 10, see also FIG. 2 depicting the product carrier 10 without the intestine 100, comprises a measuring portion 15 with one or more perforations 12 in the product carrier surface 11. The product carrier 10 comprises a fluid channel 19 and the one or more perforations 12 fluidly connect the fluid channel 19 to the surface 11 of the product carrier. The depicted fluid channel 19 is connected to a fluid supply 2. In the depicted embodiment the fluid supply comprises a water supply. In further embodiments, the fluid may comprise a gaseous fluid, such as air The product transport and sealing system 20 may move the intestine 100 over the product carrier 10 and at least temporarily seal the intestine 100 along at least part of the measuring portion 15. In the depicted embodiment, the product transport and sealing system 20 comprises a first set 251 a second set 252 of wheels 25 that may rotate as indicated by the arrows and as such transport the intestine, in the given embodiment from the left-hand side to the right-hand side. As such, the intestine 100 is moved from an upstream location to a downstream location. It is noted that in the figure the first set 251 of wheels 25 are located at an upstream end of the measuring portion 15, and the second set 252 are located at a downstream end of the measuring portion 15 (see the rotation direction of the wheels 25).

The measuring system 30 comprises a radiation sensor system 32 for measuring one or more quality parameters, such as a cross-sectional dimension 102 of the intestine 100 at the measuring portion 15. The radiation sensor system 32 comprises a (set of) a radiation source 33 and a radiation detector 34 that are radiationally coupled to each other. The radiation detector 34 is arranged downstream (with respect to the radiation 300) of the measuring portion 15 and the radiation source 33 is arranged upstream of the measuring portion 15. It is noted that the terms "downstream" and "upstream especially refer to the functional relationship between the elements. With respect to the radiation detector 34 and source 33, the functional relationship is based on the radiation radiated by the source 33 and detected by the detector 34. It is further noted that structurally the radiation source 33 and detector 34 do not necessarily have to be arranged at two (opposite) sides of the measuring portion 15. For instance, when using (radiation) reflecting elements, the detector 34 and the source 33 could be arranged at the same side of the measuring portion 15. The dimension 102 of the intestine 100 may be determined by (part of) radiation that passes the measuring portion 15 and radiation that is at least partly blocked by the intestine 100. This radiation sensor system 32 may therefore, in embodiments, also be called a shadow sensor system 35.

The measuring system 30 is functionally coupled to the control system 90. For clarity reasons functional connections between control system 90 and the measuring system 30 (as well as the other elements of the system 1) are not depicted in the figures. The control system 90 may further process a signal of the measuring system 30 and may determine a cross-sectional size of the intestine 100 at the measuring portion 15 based upon a signal of the radiation sensor system 32.

Based on the position system 40, especially the position sensor 41, the longitudinal position 101 and/or the velocity of the intestine 100 may be determined at a position sensing position 45. Based on that, the control system 90 may determine the longitudinal position 101 of the intestine at the measuring portion 15.

The radiation sensor system 32 may also be configured for sensing a fluid 200 (especially a liquid) departing from the intestine 100 at the measuring portion 15. The radiation sensor 32 may further be configured for sensing a presence of remainders of fat tissue and/or membranes at the outside surface of intestine 100 and/or for sensing mucosa inside the intestine 100 at the measuring portion 15. Hence, based on the signal of the radiation sensor system 32, the control system 90 may determine one or more quality parameters, especially one or more of the cross-sectional size of the intestine 100, at the measuring portion 15 and the presence of one or more cavities 106 in the intestine 100 at the measuring portion 15. Further based on signals of one or more optional further sensor systems, e.g. comprising a vision system (not depicted), the control system 90 may in embodiments further determine other defects such as the presence of patterns at the intestine 100 (e.g., indicating remainders of a stomach). Signals of further sensor systems may further be combined by the signal of the radiation sensor system 32 for the determination (by the control system 90) one or more of the quality parameters. The measuring system 30 may comprise further sensor systems, such as a vision system.

The cross-sectional size of the intestine 100 is a standardize size or diameter of the intestine 100. Yet, the cross-sectional dimension 102 may depend on different factors, like the type of measuring system 30, but also on the pressure in the intestine 100 at the measuring portion 15. To correct for the changes in pressure, the measuring system 30 in the given embodiment further comprises a pressure sensor 36 for sensing a fluid pressure 206 of the fluid 200 in the fluid channel 19 and a flow sensor 37 for sensing a fluid flow 209 of the fluid 200 in the fluid channel 19 (see also FIG. 2). Further an increased fluid flow 209 may indicate the presence of cavities 106 (holes or rips, etc.) in the intestine 100. Therefore, the control system 90 may especially determine the cross-sectional size of the intestine 100 and/or the presence of one or more cavities 106 in the intestine 100 based on a combination of the signal of the radiation sensor system 32, the signal of the pressure sensor 36, and the signal of the flow sensor 37 (and optional a signal of one or more further sensor systems).

FIG. 1 further demonstrates an embodiment, wherein the position system 40 comprises a measuring wheel system 42 comprising a measuring wheel 43. For measuring, the intestine 100 moving over the measuring wheel 43 to rotate the measuring wheel 43. This way the measuring wheel system 42 may sensing the longitudinal position 101 or velocity of the intestine 100 contacting the measuring wheel 43. To prevent any slip of the intestine 100 at the measuring wheel the system 1 further comprises a tension application element 7 configured to maintain tension on the intestine 100 at the measuring wheel 43. Tension may be provided by a friction element, such as a brush as indicated in the figure. Further, after installing the tension application element 7, the determination of the longitudinal position 101 of the intestine was greatly improved. It was found that a minimal but noticeable tension, e.g., of 10 or 15N, may provide a distinct and reproducible stretching of the intestine 100.

Figure 3:
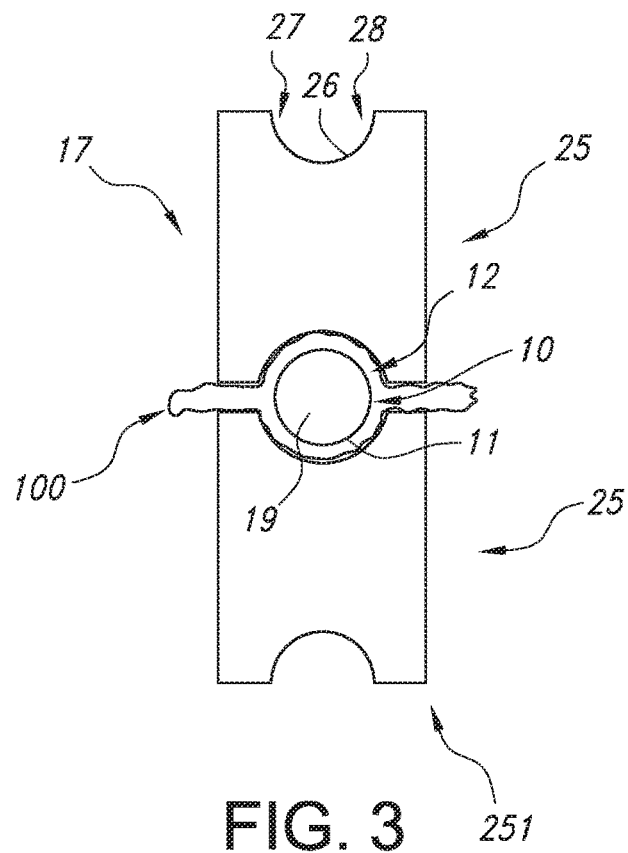

FIGS. 1-3, further, also explain embodiments of the product transport and sealing system 20, comprising the first set 251 and the second set 252 of wheels 25. In the embodiment, each wheel 25 comprises a surface 26 with a circumferential groove 27, see FIG. 3. The groove 27 has a (circular) shape 28 that is complementary to a (circular) shape 12 of the surface 11 of the product carrier 10. Because of the complementary shapes 12, 28 of the product carrier 10 and the groove 27, respectively, the wheels 25 may seal the intestine 100 at the surface of the product carrier 10. It is noted that the seal is not a hermetic seal and still some fluid may pass.

To be able to transport the intestine 100, at least one wheel 25 of the four wheels 25 of the two sets 251, 252 is driven, whereas especially all wheels 25 are rotatable. Further when starting-up the process, still air may be present in the channel and air may fill the intestine 100 at the measuring portion 15 before the fluid 200, especially liquid, even more especially water may fill the intestine 100. To facilitate release of the air, in the in FIG. 2 depicted embodiment, the upper wheel of these second set 252 of wheels 25 may translate with respect to the other wheel 25 of the second set 252, as is indicated by the double arrow. As such, the second set 252 of wheels 25 will temporarily not seal the intestine 100 at the product carrier 10, and air may leave. In other embodiments at least two, or e.g. all of the wheel 25 may be translated to and away from the product carrier 10.

Figure 4A:
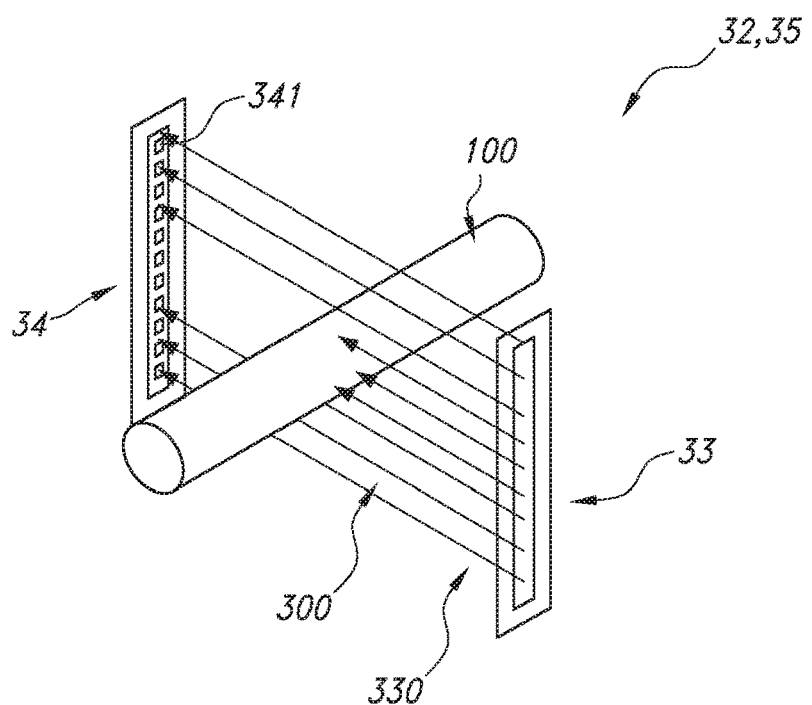
FIGS. 4A-4B schematically depict some aspects of embodiments of the measuring system.
Figure 4B:
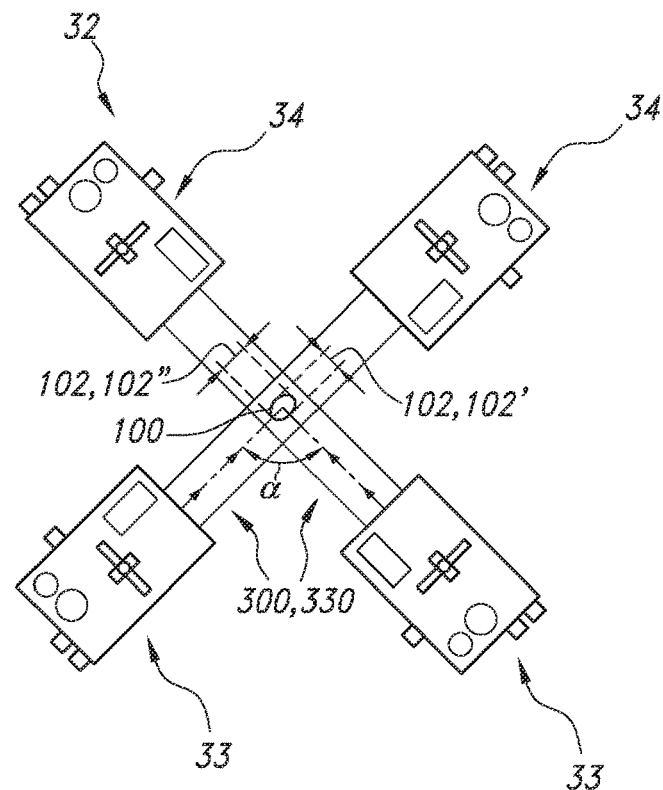

FIGS. 4A-4B schematically depict some aspects of the radiation sensor system 32. FIG. 4A depicts an embodiment, wherein the radiation source 33 is configured for emitting radiation 300 in a two-dimensional beam 330. The radiation source 33 may e.g. comprise some lenses etc. to direct the radiation 300 as a curtain or as a plurality of parallel lines. It is noted that the lines in the figures are purely to illustrate, and that the lines may all be connected to form the two-dimensional beam (or curtain) 330. The radiation is downstream from the intestine 100 detected by the radiation detector 34 comprising a one-dimensional array of radiation detecting elements 341 (which are in the figure exaggerated in size).

The radiation sensor system 32 in FIG. 4B comprises two sets of the radiation source 33 and the radiation detector 34. Here the measuring system 30 is configured for providing the two-dimensional beams 330 of the radiation sources 33 of the two sets at a mutual angle α of about 90° at the measuring portion 15. This way, e.g. the first set may measure a first cross-sectional dimension 102, 102' and the second set may measure a second cross-sectional dimension 102, 102" (in a direction perpendicular to the first one) at the same longitudinal position 101 of the intestine 100 and both may be used to determine the cross-sectional size of the intestine 100.

Figure 5:
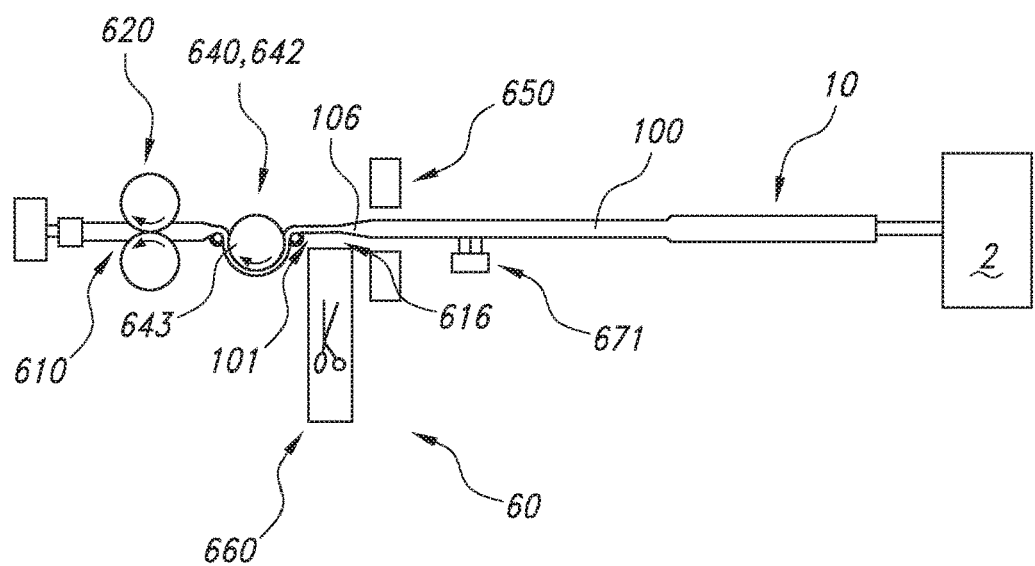
FIGS. 5-6 schematically depict some aspects of related to cutting and sorting of the intestine. The schematic drawings are not necessarily to scale.

In FIG. 5, an aspect of the system 1 is depicted showing the cutting system 60 in more detail. Although not depicted in the figure, also the cutting system 60 is functionally connected to the control system 90. The cutting system 60 is configured for cutting the intestine 100 at one or more predetermined longitudinal position 101 of the intestine 100. The predetermined locations to cut are determined by the control system 90 based on an evaluation of the determined the cross-sectional size and optionally the presence of one or more defects, such as one or more cavities 106, as a function of the longitudinal position 101 of the intestine 100.

The intestine 100 may be cut at a predetermined longitudinal position 101 of the intestine 100 based on a signal of the control system 90. For instance, the intestine 100 may be cut at the predetermined longitudinal position 101 based on one or more of a change in the cross-sectional size of the intestine 100 and the presence of cavities 106 in the intestine 100 at a further longitudinal position 101, upstream of the predetermined longitudinal position 101 of the intestine 100.

The embodiment depicts a cutting system 60 comprising a further product carrier 610, a further product transport system 620, a further position system 640, a moving system 650 and a cutting device 660. The schematic drawing further depicts the product carrier 10 and the further product carrier 610 in the remote configuration. The product carrier 10 and the further product carrier 610 are aligned but configured at a distance from each other, as indicated by the narrowing in the intestine 100. This way, the cutting device 660 may cut the intestine at a location between the product carrier 10 and the further product carrier 610.

In the depicted figure, the intestine is carried by the product carrier 10 as well as the further product carrier 610. Prior to this situation an extreme of the intestine 100 arranged at the product carrier 10 has been moved to the further product carrier 610 by the moving system 650. During moving the product carrier 10 and the further product carrier 610 were (also) are arranged aligned, but in an adjacent configuration. Further, the further product transport system 620 is configured for moving the intestine 100 over the further product carrier 610. During moving the intestine 100 over the further product carrier 610, the control system 90 may determine the longitudinal position 101 of the intestine 100 at the cutting location 616 based on a signal of the further position system 640. When a determined longitudinal position (to cut) is arranged at the cutting location, the cutting device 660 may cut the intestine 100 at the cutting location 616 (between the product carrier 10 and the further product carrier 610).

The further position system 640 in FIG. 5 comprises a further measuring wheel system 642, comprising a further measuring wheel 643, comparable to the measuring wheel 43 of the measuring wheel system 42 used in the measuring stage. The further measuring wheel 643 is arranged contacting the intestine 100 at a location between the product carrier 10 and the further product carrier 610, especially to tension the intestine 100, especially in combination with the further tension application element 671, like it was accomplished in the measuring stage by the tension application element 7. The further measuring wheel system 642 may sense the longitudinal position 101 of the intestine 100 contacting the further measuring wheel 643 while maintaining tension on the intestine 100.

Figure 6:
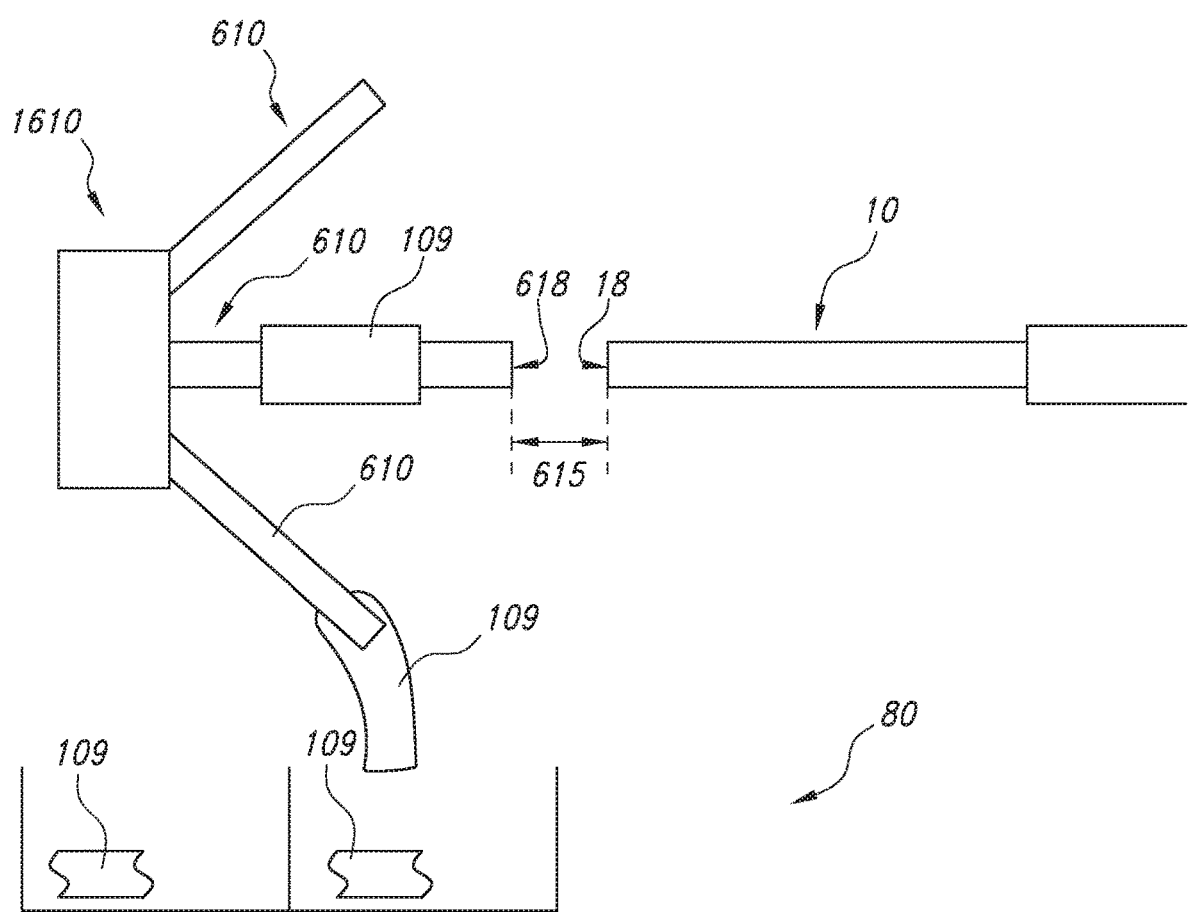

FIG. 6 very schematically depicts a further embodiment of the system 1 also comprising a collecting system 80 (functionally connected to the control system 90). For clarity reasons, and for explaining some further aspects, most of the other elements are left out. The collecting system 80 may advantageously be used in systems (and in the method) wherein the cutting system 60 is configured for cutting the intestine 100 at n predetermined longitudinal positions of the intestine 100 or wherein the cutting system is used not to cut the intestine at all (i.e. n=0). Hence n may be zero. This way n+1 parts 109 of the intestine 100 (including the entire intestine 100 if no cutting is required) are provided. These parts 109 or the entire intestine 100 (when not being cut) may successively be sorted based on the cross-sectional size of (the part 109 of) the intestine 100 and/or based on the presence of defects such as cavities 106 or other defects described above in the part 109 of intestine 100. The collecting system 80 may therefore especially be configured to sort and collect the parts 109 of the intestine 100 based on at least one of the (i) cross-sectional size of the part 109 of intestine 100 and (ii) the presence of defects, especially cavities 106, in the part 109 of intestine 100. The embodiment comprises a further product carrier system 1610 comprising three further product carriers 610. This way, after having cut a first part 109 of the intestine and having moved it at the further product carrier 610, a next extreme of the intestine 100 (in fact the part upstream from the predetermined location being cut) may be moved to another further product carrier 610. The parts 109 may than be sorted and collected in the collecting system (controlled by the control system 90). Optionally, downstream from the collecting system 80, further processing systems, like a salting system and/or a labeling system may be configured.

FIG. 6 further schematically depicts the inter carrier distance 615, i.e. a distance between the product carrier 10 and the further product carrier 610. In the adjacent configuration, the inter carrier distance 615 may be zero up to several centimeters. In the remote configuration this distance is normally larger to be able to cut the intestine 100 at this location. The figure further indicates the first end 18 of the product carrier 10 and the first end 618 of the further product carrier 610. These respective ends 18, 618 may in embodiments be configured complementary in shape, such that in the adjacent configuration the respective end 18, 618 may engage with each other, further facilitating the movement of the intestine from the product carrier 10 to the further product carrier 610.

The term "plurality" refers to two or more. Furthermore, the terms "a plurality of" and "a number of" may be used interchangeably The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%. For numerical values it is to be understood that the terms "substantially", "essentially", "about", and "approximately" may also relate to the range of 90%-110%, such as 95%-105%, especially 99%-101% of the values(s) it refers to.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A system for sizing a natural intestine, wherein the system comprises (i) a product carrier, (ii) a product transport and sealing system, (iii) a measuring system, and (iv) a control system; wherein
   the product carrier comprises a fluid channel and a measuring portion, wherein a product carrier surface at the measuring portion comprises one or more perforations fluidly connected to the fluid channel;
   the product transport and sealing system is configured (i) for moving the intestine over the product carrier, wherein the intestine surrounds the product carrier surface, and (ii) for temporarily sealing the intestine along at least part of the measuring portion;
   the measuring system comprises (i) a radiation sensor system for measuring a cross-sectional dimension of the intestine at the measuring portion, wherein the radiation sensor system comprises a radiation source radiationally coupled to a radiation detector, wherein the radiation detector is arranged downstream of the measuring portion, relative to the radiation source, (ii) a pressure sensor for sensing a fluid pressure of the fluid in the fluid channel, and (iii) a flow sensor for sensing a fluid flow of the fluid in the fluid channel;
   the control system is configured for determining a cross-sectional size of the intestine at the measuring portion based on a combination of (i) a signal of the radiation sensor system, (ii) a signal of the pressure sensor, and (iii) a signal of the flow sensor.

2. The system according to claim 1, wherein the radiation sensor system is further configured for sensing a fluid departing from the intestine at the measuring portion, wherein the control system is further configured for determining a presence of one or more cavities in the intestine at the measuring portion based on the signal of the radiation sensor system.

3. The system according to claim 1, wherein the control system is configured for determining the presence of one or more cavities in the intestine based on a combination of (i) the signal of the radiation sensor system, (ii) the signal of the pressure sensor and (iii) the signal of the flow sensor.

4. The system according to claim 1, wherein the radiation sensor system is a shadow sensor system comprising the radiation source and the radiation detector.

5. The system according to claim 1, wherein the radiation source is configured for emitting radiation in a two-dimensional beam and wherein the radiation detector comprises an array of radiation detecting elements for detecting at least part of the radiation, wherein the measuring system comprises two sets of (i) the radiation source and (ii) the radiation detector, wherein the measuring system is configured for providing the two-dimensional beams of the radiation sources of the two sets at a mutual angle ($\alpha$) at the measuring portion, wherein the angle ($\alpha$) is selected in the range of 80°-100°.

6. The system according to claim 1, wherein the product transport and sealing system comprises a first set of wheels and a second set of wheels, wherein each wheel comprises a surface with an circumferential groove with a shape complementary to a shape of the surface of the product carrier, wherein one or more of the first set of wheels and the second set of wheels is configured for moving the intestine over the product carrier and wherein the first set and the second set of wheels are configured for sealing the intestine at the product carrier.

7. The system according to claim 1, wherein the system further comprises a position system, functionally connected to the control system, comprising a position sensor for sensing one or more of (i) the longitudinal position of the intestine at a position sensing position and (ii) a velocity of the intestine at the a position sensing position; wherein the control system is further configured for determining the longitudinal position of the intestine at the measuring portion based on a signal of the position sensor.

8. The system according to claim 7, wherein the position system comprises a measuring wheel system comprising a measuring wheel, wherein the measuring wheel system is configured for sensing the longitudinal position of the intestine contacting the measuring wheel, wherein the system further comprises a tension application element configured to maintain tension on the intestine at the measuring wheel.

9. The system according to claim 7, wherein the system further comprises a cutting system functionally connected to the control system, wherein the cutting system is configured for cutting the intestine at a predetermined longitudinal position of the intestine, wherein the predetermined longitudinal position is determined by the control system based on one or more of a change in the cross-sectional size of the intestine and the presence of cavities in the intestine at a further longitudinal position, upstream of the predetermined longitudinal position of the intestine.

10. The system according to claim 9, wherein the system further comprises a collecting system functionally connected to the control system, wherein the cutting system is configured for cutting the intestine at n predetermined longitudinal positions of the intestine to provide n+1 parts of the intestine, and wherein the collecting system is configured to sort and collect the parts of the intestine, wherein the parts are sorted based on at least one of the (i) cross-sectional size of the part of intestine and (ii) the presence of cavities in the part of intestine.

11. The system according to claim 9, wherein the cutting system comprises a further product carrier, a further product transport system, a further position system, a moving system and a cutting device; wherein
   the moving system is configured for moving an extreme of the intestine arranged at the product carrier to the further product carrier, while the product carrier and the further product carrier are arranged aligned and in an adjacent configuration;
   the further product transport system is configured for moving the intestine over the further product carrier; and
   the cutting device is configured for cutting the intestine at a cutting location between the product carrier and the further product carrier, while the product carrier and the further product carrier are arranged in a remote configuration; wherein the control system is further configured for determining the longitudinal position of the intestine at the cutting location based on a signal of the further position system.

12. A method for sizing a natural intestine, wherein the method comprises:

providing the natural intestine on a product carrier comprising a fluid channel and a measuring portion, wherein the intestine surrounds a product carrier surface at the measuring portion, wherein the measuring portion comprises one or more perforations fluidly connecting the fluid channel with the product carrier surface at the measuring portion;

providing a fluid to the fluid channel, thereby providing the fluid in the intestine via the one or more perforations in the product carrier surface at the measuring portion;

moving the intestine over the product carrier while sealing the intestine along at least part of the measuring portion;

emitting radiation by a radiation source of a radiation sensor system to the measuring portion and sensing at least part of the radiation with a radiation detector of the radiation sensor system at a position downstream of the measuring portion relative to the radiation source, and sensing a fluid pressure and a fluid flow of the fluid in the fluid channel; and determining a cross-sectional size of the intestine at the measuring portion based on a combination of the fluid pressure, the fluid flow, and a signal of the radiation sensor system.

13. The method according to claim 12, wherein the method further comprises determining a presence of one or more cavities at the measuring portion based on the signal of the radiation sensor system.

14. The method according to claim 12, wherein the method comprises determining the presence of one or more cavities at the measuring portion based on the fluid pressure, the fluid flow, and the signal of the radiation sensor system.

15. The method according to claim 12, further comprising determining a longitudinal position of the intestine at the measuring portion and determining the cross-sectional size and optionally the presence of one or more cavities as a function of the longitudinal position of the intestine.

16. The method according to claim 15, wherein the method further comprises cutting the intestine at a predetermined longitudinal position of the intestine, based on the cross-sectional size and optionally the presence of one or more cavities as a function of the longitudinal position of the intestine.

17. The method according to claim 16, wherein the method comprises:

cutting the intestine at n longitudinal positions of the intestine, based on the cross-sectional size and optionally the presence of one or more cavities as a function of the longitudinal position of the intestine to provide n+1 parts of the intestine, and sorting the parts of the intestine, based on at least one of the (i) cross-sectional size of the part of intestine and (ii) the presence of cavities in the part of intestine.

* * * * *